J. T. PLATO.
Neck-Yoke.
No. 8,693. Patented Jan. 27, 1852.
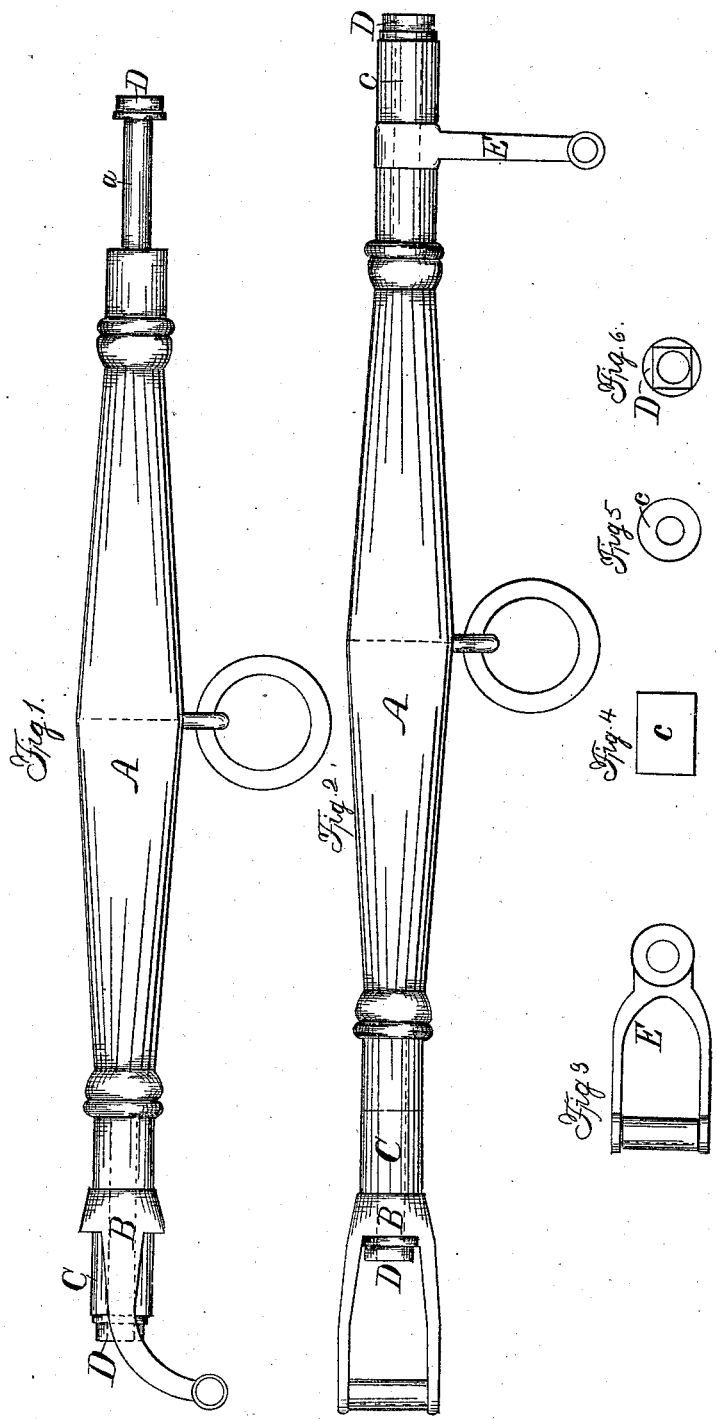

UNITED STATES PATENT OFFICE.

JOHN T. PLATO, OF JASPER, NEW YORK.

NECK-YOKE.

Specification of Letters Patent No. 8,693, dated January 27, 1852.

*To all whom it may concern:*

Be it known that I, JOHN T. PLATO, of Jasper, in the county of Steuben and State of New York, have invented a new and useful Extension Swivel-Yoke for Teaming and Carriage Purposes, and do hereby declare that the following is a full and exact description thereof, reference being had to the accompanying drawings, making a part of this specification.

The nature of my invention consists in providing the yoke at the point of the pole of a carriage or other vehicle with a swivel link (for the attachment of the breast strap of harness) at each end and washers to adjust its length as desired.

Figure 1 is a view of the yoke A with the swivel link B, and the adjusting washer C, outside of the swivel and secured by a nut D, on one end, the other end showing the bolt $a$, and nut D, only. Fig. 2 is a vertical view of the yoke with the swivel on the same end extended, the washer C, being inside of the swivel; on the other end is a straight swivel E which is put on the yoke at right angles to it before the washers and shortens it more than the swivel B. Fig. 3 is a side view of the swivel E. Fig. 4 is a longitudinal view of the washer C. Fig. 5 is an end view of same washer. Fig. 6 is an end view of the nut used to secure the swivel and washer in their respective places.

Where the same letters occur in different figures they indicate the same parts.

To enable others to make and use my invention I will proceed to describe its construction and operation.

I first make a common yoke A, of the smallest length usually required, and affix to each end thereof a bolt or rod of iron A, with a screw and nut D, on its extremity; I then provide a swivel link B, and one or more washers C, fitted on said bolt. The swivel link may be put on the bolt first, (or between the washers if more than one is used,) or at the extreme end, only having the nut outside to secure it. The straight swivel E, is to be used if it should be advisable to shorten the yoke still more than can be done with the curved one.

The advantage of the extension yoke is that its length can be adjusted to suit the distance the horses are required to travel from the pole, that the breast strap may always be in a direct line forward from the horse's collar to the yoke.

The advantage of the swivel on the bolt of yoke is that it may and will always accommodate itself to the angle of elevation of the strap or chain connecting it with the hames or collar, and consequently will not cut or wear it through near so soon.

Having thus described my invention what I claim therein as new and desire to secure by Letters Patent is—

The combination of the washers C the swivels B or E bolt $a$ and nut D with the ordinary neck yoke arranged in the manner and for the purpose herein set forth.

In testimony whereof I have hereunto signed my name before two subscribing witnesses.

JOHN T. PLATO.

Witnesses:
N. C. RYDER,
DANIEL KNAPP.